A. C. PAULSMEIER.
GREASE CUP.
APPLICATION FILED JULY 8, 1912.
1,101,952.
Patented June 30, 1914.
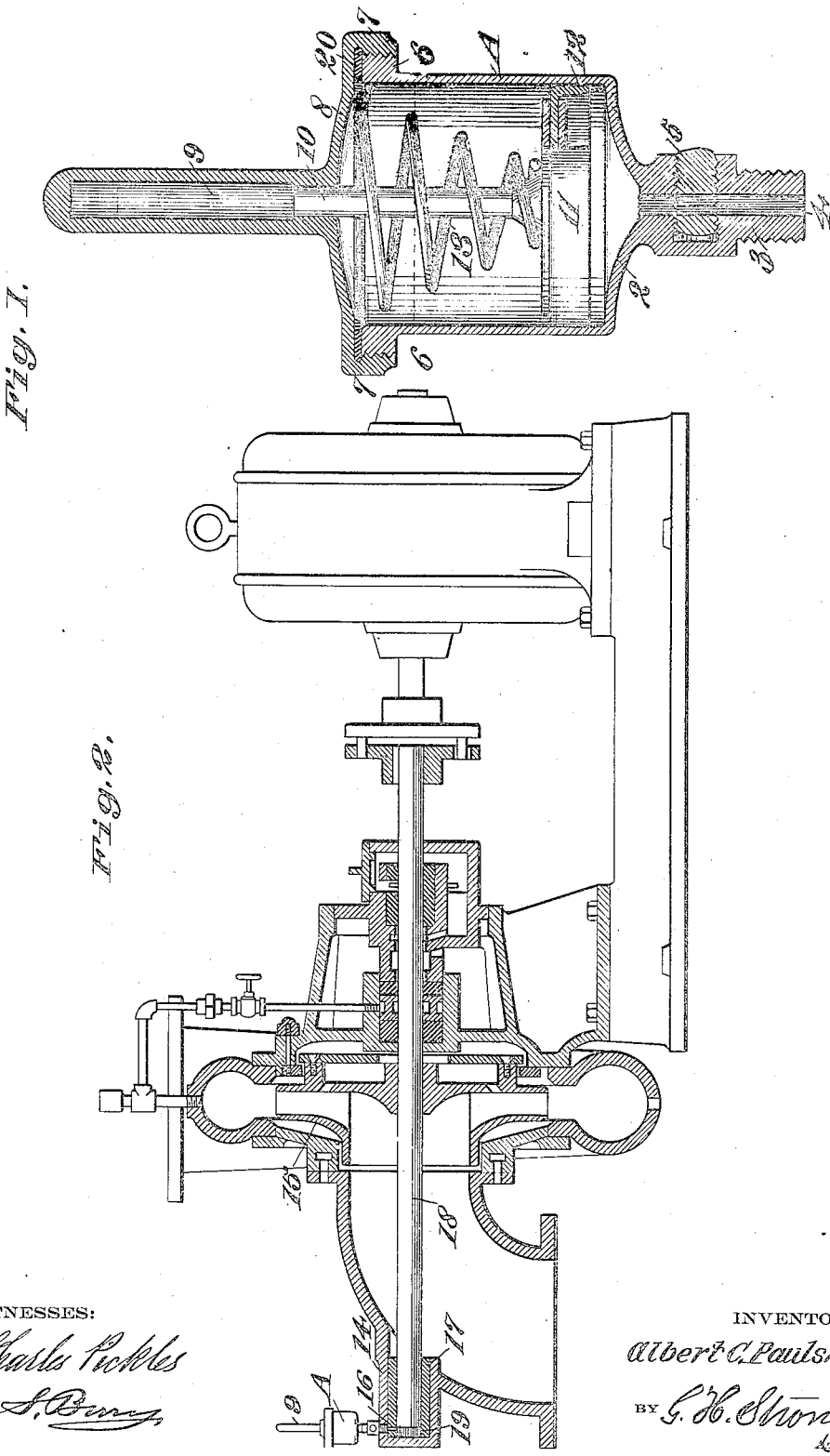
WITNESSES:
Charles Pickles
R. S. Berry
INVENTOR
Albert C. Paulsmeier.
BY G. H. Strong.
ATTORNEY

UNITED STATES PATENT OFFICE.

ALBERT C. PAULSMEIER, OF ALAMEDA, CALIFORNIA, ASSIGNOR TO BYRON JACKSON IRON WORKS, OF WEST BERKELEY, CALIFORNIA, A CORPORATION OF CALIFORNIA.

GREASE-CUP.

1,101,952.   Specification of Letters Patent.   Patented June 30, 1914.

Application filed July 8, 1912. Serial No. 708,204.

*To all whom it may concern:*

Be it known that I, ALBERT C. PAULSMEIER, a citizen of the United States, residing at Alameda, in the county of Alameda and State of California, have invented new and useful Improvements in Grease-Cups, of which the following is a specification.

This invention relates to a grease cup, and particularly pertains to a grease cup or lubricant receptacle, which is especially adapted for use in connection with centrifugal pumps.

It is the object of this invention to provide a grease cup of such character that no air can find its way through the grease into the bearing, and thereby disturb the vacuum of the pump.

Another object is to provide a lubricant receptacle for centrifugal pumps in which the lubricant can not be drawn therefrom by the suction of the pump.

The invention resides in mounting an air tight cap on the grease cup, and forming the cup with an air-tight tubular extension in which the stem of the grease cup piston is guided.

The invention further consists of the parts and the construction and combination of parts as hereinafter more fully described and claimed, having reference to the accompanying drawings, in which—

Figure 1 is a vertical section of the invention partly in elevation. Fig. 2 is a view in longitudinal section of a centrifugal pump, showing the invention as applied in elevation.

In the drawings A represents the cylindrical walls of the grease cup which terminate in a convergent bottom 2, having the usual threaded nipple 3 formed thereon. The nipple 3 is provided with the usual grease delivery passage 4, the area of which is regulated by means of a valve comprising a threaded plug 5 mounted in the nipple 3, and which plug is formed with a transversely extending perforation conforming to and registering with the passage 4. By turning the plug 5 in its threaded mounting the perforation therein may be caused to register with the passage 4, or be thrown out of alinement therewith, so that the outer wall of the plug 5 will obstruct the passage 4 to any desired extent. Formed on the upper end of the cylinder A is an outwardly extending annular flange 6, which is threaded on its outer periphery to receive a correspondingly threaded downwardly extending, annular flange, 7, forming part of a cap 8. The cap 8 is provided with an upwardly extending, tubular portion 9, which is closed at its outer end and is open at its inner end to receive a stem 10 on a piston 11, and form a guide therefor. The piston 11 is provided with a cup leather 12, in the manner common in grease cups, and positioned between the piston 11 and the cap 8 is a helical spring 13, which surrounds the stem 10 and bears between the cap 8 and the piston 11 in such manner as to normally bear against the piston 11 to move it downwardly away from the cap 8, when the spring 13 is depressed.

In the application of the invention, the grease cup A is attached to the bearing 14 on the vacuum side of a centrifugal pump 15, in the usual manner; the threaded nipple 3 being screwed into a correspondingly threaded perforation formed in the bearing 14, which registers with a perforation 16 in a bushing 17 in which the pump shaft 18 rotates. The perforation 16 in the bushing 17 leads to a grease-space 19 formed by the bushing 17, the end wall of the bearing 14 and the end of the shaft 18. The cap 8 and piston 11 being removed, the cup A and the chamber 19 are filled with a suitable grease, or other lubricant, whereupon the piston 11 is inserted in the upper end of the grease cup A, on top of the grease therein. The threaded flange 7 on the cap 8 is then engaged with the threaded flange 6 on the grease cup A, and is screwed tightly thereon; a leather gasket 20 being disposed between the outer end of the grease cup and the inner wall of the cap 8 to form a tight joint at this point. The cap 8 on being screwed into position on the cup A, depresses the spring 13 so that it will exert a pressure on the piston 11, which pressure will be transmitted to the grease in the grease cup through the cup-leather 12. When the grease cup is first filled, the piston 11 will be positioned in the upper end of the grease cup A with its stem extending into the tubular extension 9 on the cap 8, as indicated in dotted lines in Fig. 1.

In the operation of the invention, the spring 13 acts to force the grease in the grease cup A below the piston 11 and cup-leather 12, into the grease chamber 19 through the passage 4 and perforation 16; the grease being fed slowly into the grease chamber 19, as it is drawn from the latter by the rotation of the shaft 18, in the usual manner. It will be observed that as the piston 11 is moved downward, a vacuum is formed between the upper portion of the piston and the cap 8, for the reason that no air to break the vacuum can enter the cup through the cap. This vacuum above the piston 11 will be practically equal to that formed below the piston by the action of the centrifugal pump, thereby counteracting the tendency of the pump to pull upon the bottom of the piston by suction. By mounting the piston stem 10 in an inclosed guide, no air can enter the cup therearound. It is manifest that as no air can enter the grease cup A, no air will be drawn into the interior of the pump therethrough to disturb the vacuum of the pump, and that as no air can enter the cup to displace the grease, an excess quantity of grease will be prevented from being drawn from the cup A by the suction of the pump.

Having thus described my invention, what I claim and desire to secure by Letters Patent, is—

A lubricator for centrifugal pump bearings comprising a lubricant receptacle provided with an opening leading to said bearing, means for obstructing said opening to any desired extent, a piston in said receptacle arranged to follow the lubricant as it feeds through the opening, said piston forming an air tight joint with the walls of the receptacle, an air tight cover for said receptacle, a leather gasket between said air tight cover and the ends of the cylindrical walls of the lubricant receptacle to form an air tight joint, a hollow tubular extension formed integral with said cover, the lower end of said tubular extension having a relatively smaller bore than the remainder thereof to form a bearing, a stem carried by the piston projecting into the tubular projection on the cover and guided by the bearing formed therein, and a conical spring bearing against said piston and cover, the construction forming a vacuum above the piston as the lubricant is discharged to the bearing.

In testimony whereof I have hereunto set my hand in the presence of two subscribing witnesses.

ALBERT C. PAULSMEIER.

Witnesses:
R. N. FORD,
W. A. SHEEHAN.